(12) United States Patent
Smith et al.

(10) Patent No.: US 7,168,233 B1
(45) Date of Patent: Jan. 30, 2007

(54) SYSTEM FOR CONTROLLING STEAM TEMPERATURE

(75) Inventors: Raub Warfield Smith, Ballston Lake, NY (US); Barrett David Gardiner, Malta, NY (US); S. Can Gulen, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/301,658

(22) Filed: Dec. 12, 2005

(51) Int. Cl.
*F02C 6/00* (2006.01)

(52) U.S. Cl. .................. 60/39.182; 60/653; 60/679

(58) Field of Classification Search .............. 60/39.02, 60/39.182, 39.19, 39.83, 653, 679
See application file for complete search history.

(56) References Cited

U.S. PATENT DOCUMENTS

| | | | | |
|---|---|---|---|---|
| 2,982,864 A | * | 5/1961 | Furreboe | 290/2 |
| 3,205,870 A | * | 9/1965 | Durham et al. | 122/479.5 |
| 3,796,045 A | * | 3/1974 | Foster-Pegg | 60/772 |
| 5,428,950 A | | 7/1995 | Tomlinson et al. | 60/39.02 |
| 5,628,179 A | * | 5/1997 | Tomlinson | 60/783 |
| 6,397,575 B2 | | 6/2002 | Tomlinson et al. | 60/39.02 |
| 6,605,180 B2 | * | 8/2003 | Snekkenes et al. | 162/17 |
| 6,655,144 B2 | * | 12/2003 | Kangai et al. | 60/645 |
| 2004/0172951 A1 | * | 9/2004 | Hannemann et al. | 60/776 |

* cited by examiner

*Primary Examiner*—Hoang Nguyen
(74) *Attorney, Agent, or Firm*—Cantor Colburn LLP

(57) ABSTRACT

A system for controlling steam temperature that includes steam circuit including a reheater circuit, at least one reheater dilution region, at least one reheater dilution conduit, and at least one reheater supply region disposed upstream of the at least one reheater dilution region, wherein the at least one reheater supply region and the at least one reheater dilution region are associated via the reheater circuit and the at least one reheater dilution conduit.

12 Claims, 3 Drawing Sheets

Attemperating reheat steam within at least one reheater dilution region of a steam circuit with upstream steam from at least one reheater supply region of the steam circuit.

Attemperating steam within at least one dilution region of a steam circuit with steam from at least one coolant coil.

US 7,168,233 B1

SYSTEM FOR CONTROLLING STEAM TEMPERATURE

FIELD OF THE INVENTION

This disclosure relates generally to a system for controlling steam temperature, and more particularly to a system for controlling steam temperature within combined cycle power generation system.

BACKGROUND OF THE INVENTION

In general, a combined cycle power generation system includes a gas turbine, a steam turbine, a steam cycle, and a multiple pressure combined cycle heat recovery steam generator (HRSG). Steam supply to the steam turbine from the HRSG must be temperature controlled in order to keep the steam temperature from exceeding the rated temperature of the HRSG, interconnecting steam piping, and the steam turbine. One method for controlling and limiting steam temperature includes injection of a water spray into a conventional spray attemperator located upstream (in relation to steam flow) of the final reheater and superheater passes. The water source is typically a high pressure feedwater pump located upstream of at least one economizer disposed within the HRSG.

Though water spray attemperation effectively controls and limits steam temperature, the water used in the spray can contain contaminants damaging to the gas/steam turbine. Water spray attemperation also causes significant reduction in combined cycle performance and efficiency due to the latent heat required for vaporization of the attemperation spray water, which effectively comes from the high level exhaust energy. There is a desire, therefore, for a combined cycle power generation system that controls/limits steam temperature without incurring a performance penalty resulting from use of high level exhaust energy to supply the latent heat of vaporization associated with water spray attemperation.

BRIEF DESCRIPTION OF THE INVENTION

Disclosed is a system for controlling steam temperature that includes a steam circuit including a reheater circuit, at least one reheater dilution region, at least one reheater dilution conduit, and at least one reheater supply region disposed upstream of the at least one reheater dilution region, wherein the at least one reheater supply region and the at least one reheater dilution region are associated via the reheater circuit and the at least one reheater dilution conduit.

Also disclosed is a system for controlling steam temperature that includes a steam circuit including and at least one dilution region and at least one supply region, at least one cooling area, and at least one cooling coil associating the at least one dilution region with the at least one supply region, wherein the at least one cooling coil is at least partially disposed within the at least one cooling area.

Additionally disclosed is a method for controlling steam temperature that includes attemperating reheat steam within at least one reheater dilution region of a steam circuit with steam from at least one reheater supply region of the steam circuit, wherein the at least one reheater supply region is disposed upstream of the dilution region.

Further disclosed is a method for controlling steam temperature that includes attemperating steam within at least one dilution region of a steam circuit with steam from at least one coolant coil, wherein the at least one cooling coil is disposed at least partially within at least one cooling area.

BRIEF DESCRIPTION OF THE DRAWINGS

The foregoing and other features and advantages of the present invention should be more fully understood from the following detailed description of illustrative embodiments taken in conjuncture with the accompanying Figures in which like elements are numbered alike in the several Figures:

FIG. 3 is a block diagram illustrating a first method for controlling steam temperature without the latent heat of vaporization associated with water attemperation; and FIG. 4 is a block diagram illustrating a second method for controlling steam temperature without the latent heat of vaporization associated with water attemperation.

DETAILED DESCRIPTION OF THE INVENTION

Figure 1:
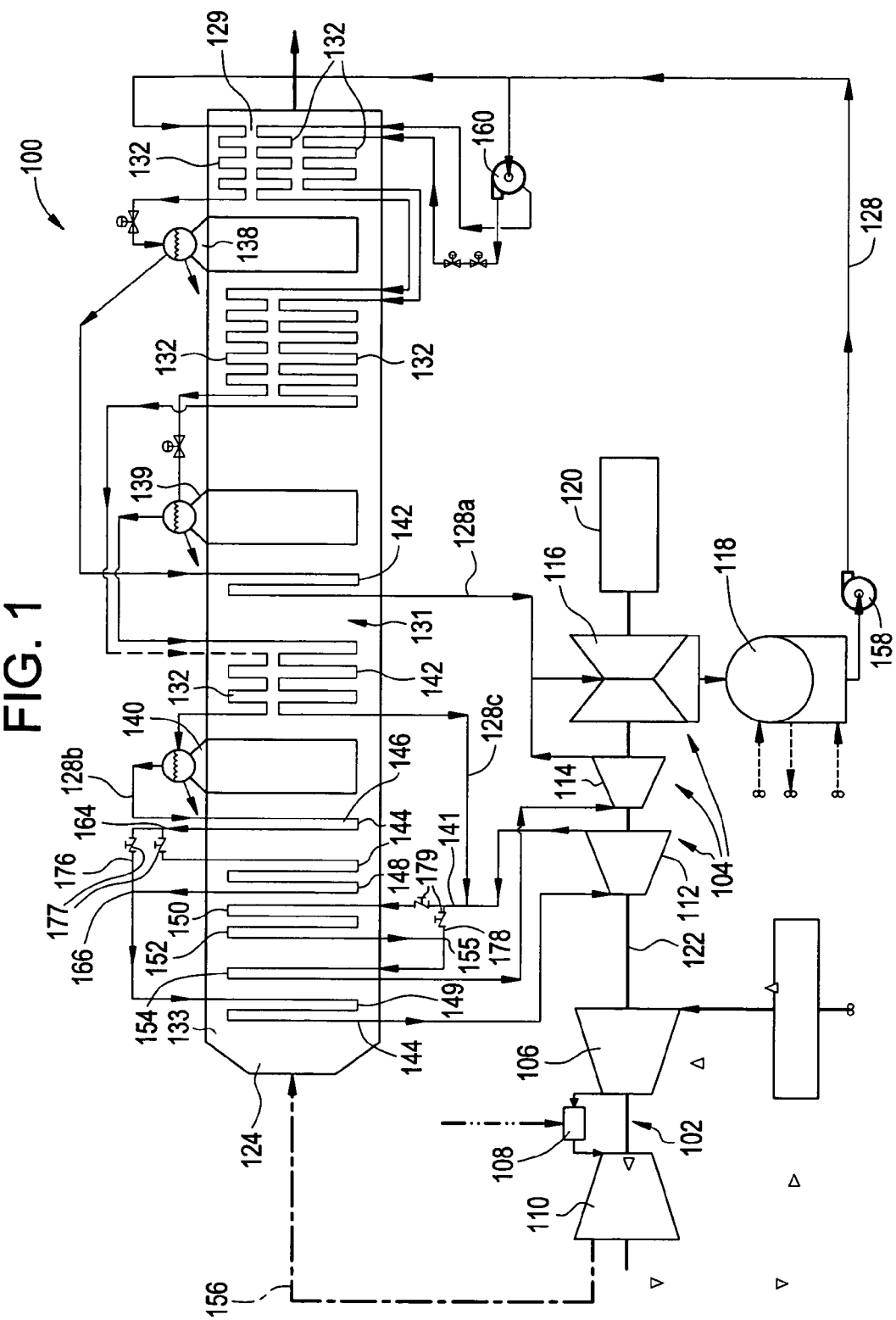
FIG. 1 is a schematic flow diagram of a system for controlling steam temperature without water attemperation or the performance penalty therefrom, wherein the system is in accordance with a first embodiment.

Referring to FIG. 1, a first embodiment of a system 100 for controlling steam temperature is illustrated, and includes a gas turbine 102 and a steam turbine 104. The gas turbine 102 includes a compressor 106, a combustion area 108, and a turbine 110. The steam turbine 104 may include at least one high pressure section 112, at least one intermediate pressure section 114, and at least one low pressure section 116, wherein the at least one low pressure section 116 may exhaust into a condenser 118. The steam turbine 104 also drives a generator 120 that produces electrical power (or other load). The gas turbine 102 and steam turbine 104 are associated in tandem via a single shaft 122 that drives a single generator 120, though each may alternately drive separate loads.

The gas turbine 102 and steam turbine 104 are additionally associated with a multi-pressure heat recovery steam generator (HRSG) 124, which includes a high pressure (HP) region 133, an intermediate pressure (IP) region 131, and a low pressure (LP) region 129. The HRSG 124 also includes a steam circuit which transports steam and water. The steam circuit is too expansive and complex to designate as a singular structure within the illustration, and thus will be named and numbered in sections hereinbelow. The HRSG 124 is associated with the gas turbine 102 via an exhaust gas conduit 156, which transports heated gas into the HRSG 124, and is associated with the steam turbine 104 via the steam circuit.

The steam circuit includes at least one economizer (illustrated throughout the HRSG at 132), at least one evaporator (illustrated as an HP evaporator 140, and IP evaporator 139, and an LP evaporator 138), at least one superheater 142, and a reheater circuit 150. The at least one superheater 142 to be discussed in detail is a high pressure (in relation to its positioning within the HRSG 124 and designated henceforth as HP) superheater circuit 144, illustrated to include a first HP superheater section 146, a second HP superheater section 148, and a third HP superheater section 149, although steam temperature control could be achieved with a single (one pass circuit) superheater section. The first HP superheater section 146, the second HP superheater section 148, and the third HP superheater section 149 are associated with each other within the HP superheater circuit 144 in a manner that allows steam to flow downstream from the first HP superheater section 146, through the second HP superheater section 148, and into the third HP superheater section 149.

The HP superheater 144 further includes at least one superheater supply region, illustrated and referred to hereinafter as superheater supply region 164, and at least one superheater dilution region, illustrated and referred to hereinafter as superheater dilution region 166. The superheater dilution region 166 is disposed downstream (in relation to steam flow direction) of the superheater supply region 164, and is associated with said the superheater supply region 164 via at least one superheater dilution conduit, illustrated and referred to hereinafter as superheater dilution conduit 176, and the HP superheater circuit 144 (or the second HP superheater section 148, as is shown in the illustration). The association via the superheater dilution conduit 176 allows for dilution of downstream steam (in relation to steam flow) from the second HP superheater section 148 with cooler steam from the upstream superheater supply region 164.

As is mentioned above, the steam circuit includes the reheater circuit 150. The reheater circuit 150 is illustrated to include a first reheater section 152 and a second reheater section 154, although steam temperature control in the reheater circuit 150 could be achieved with a single (one pass circuit) reheater section. The first reheater section 152 and the second reheater section 154 are disposed within the reheater circuit 150 in a manner which allows steam to flow downstream from the first reheater section 152 to the second reheater section 154.

Further disposed along the steam circuit is at least one reheater dilution region, illustrated and referred to hereinafter as reheater dilution region 155, and at least one reheater supply region, illustrated and referred to hereinafter as reheater supply region 141. The reheater supply region 141 is disposed upstream (in relation to steam flow through the steam circuit) of the reheater dilution region 155, wherein the reheater supply region 141 and reheater dilution region 155 are associated via the reheater circuit 150 (or the first reheater section 152, as is shown in the illustration), as well as at least one reheater dilution conduit, illustrated and referred to hereinafter as reheater dilution conduit 178. The reheater dilution conduit 178 allows steam to bypass the first reheater section 152 and dilute reheated steam in the reheater dilution region 155 with cooler steam from the reheater supply region 141. It should be appreciated however, that though the reheater dilution region 155 is illustrated within the multi pass/section reheater circuit, it may also be disposed downstream of a single pass/section reheater circuit, wherein the dilution conduit would bypass the reheater circuit altogether. It should be further appreciated that at least one steam flow controlling device will be associated with said reheater circuit 150 and said HP superheater circuit 144, wherein the at least one steam flow control device may be a device such as but not limited to at least one control valve, illustrated as at least one superheater dilution valve 177 and at least one reheater dilution valve 179.

With the components (excepting some illustrated steam circuit sections and pumps) of the system 100 introduced, the manner in which these components interact will now be discussed. Condensate is fed from the condenser 118 to the LP region 129 of the HRSG 124 via at least one condensate line 128 (section of the steam circuit) with the aid of a condensate pump 158. The condensate subsequently traverses at least one economizer 132 and the LP evaporator 138, before being superheated and returned to the at least one low pressure section 116 of the steam turbine 104 via at least one low pressure conduit 128a (section of the steam circuit).

With the aid of a pump 160, feedwater also passes into the LP region 129 of the HRSG 124, wherein the feedwater travels to at least one economizer and into the IP evaporator 139 and HP evaporator 140. The HP evaporator 140 thus recovers exhaust energy necessary to supply a latent heat that converts feedwater to HP steam. Steam exiting the HP evaporator 140 is transported on to the HP superheater circuit 144 via a steam conduit 128b (section of the steam circuit). Similarly, the IP evaporator 139 also recovers exhaust energy necessary to supply a latent heat that converts feedwater to IP steam, wherein the steam is transported from the IP evaporator 139 to the reheater circuit 150 via at least one a steam conduit 128c (section of the steam circuit), and possibly the reheater supply region 141.

Steam traveling from the HP evaporator 140 enters the HP superheater circuit 144 and travels through the first HP superheater section 146 into the superheater supply region 164. From the superheater supply region 164 at least a portion of the steam may pass onto at least one of the second HP superheater section 148 and the superheater dilution conduit 176 with the aid of the at least one superheater dilution valve 177.

Steam that has passed into the second HP superheater section 148 is heated and eventually enters the superheater supply region 164. However, steam that entered the superheater dilution conduit 176 (under the control of at least one superheater dilution valve 177) also travels from the superheater supply region 164 to the superheater dilution region 166, and does so without being heated within the second HP superheater section 148. The steam from the superheater dilution conduit 176 will thus dilute and cool the steam which has traversed and been heated in the second HP superheater section 148 without use of water spray attemperation. Eliminating water spray attemperation further eliminates the performance penalty associated with supplying the latent heat of vaporization for water spray entirely with exhaust energy hotter than the water saturation temperature. This improves cycle efficiency. It should be appreciated however, as was briefly mentioned above, that only one superheater pass is necessary to achieve a desired dilution. A superheater dilution conduit may transport diluting steam from a supply area anywhere upstream of a one pass/section HP superheater circuit to a dilution area disposed anywhere downstream (or in close proximity to) of a superheater exit in order to dilute superheated steam. Multiple sections are typically employed however, (as is illustrated) so as to improve operability and cost.

Referring now to the reheater circuit 150, steam from at least one of the steam turbine 104 and the IP evaporator 139 is illustrated to enter the reheater supply region 141, (though a reheater supply region may be disposed anywhere upstream of the reheater dilution region 155). From the reheater supply region 141, at least a portion of the steam passes into at least one of the first reheater section 152 and the reheater dilution conduit 178 under the control of the at least one reheater dilution valve 179. Steam that enters the first reheater section 152, which acts as the portion of the reheater circuit 150 that associates the reheater supply region 141 and the reheater dilution region 155, is heated and passed to the reheater dilution region 155, and eventually the second reheater section 154. However, steam that entered the reheater dilution conduit 178 (under the control of at least one reheater dilution valve 179) also travels from the reheater supply region 141 to the reheater dilution region 155, and does so without being heated within the first reheater section 152. This cooler steam from the at least one reheater dilution conduit 178 dilutes, and thus cools/controls the steam which has traversed and been heated in the first reheater section 152, preventing steam in the reheater circuit 150 from exceeding the rated temperature of the HRSG 124, the IP steam turbine 104, and/or the steam circuit without use of water spray attemperation. Eliminating water spray attemperation further eliminates the performance penalty associated with providing the latent heat of vaporization of the water spray entirely with exhaust energy hotter than the water saturation temperature, improving combined cycle efficiency. Like with the superheater, it should be appreciated that only one reheater pass is necessary to achieve a desired dilution.

It should be appreciated that the system 100 may be employed in applications involving steam temperature control such as but not limited to combined cycle systems and direct fired steam cycles.

Figure 2:
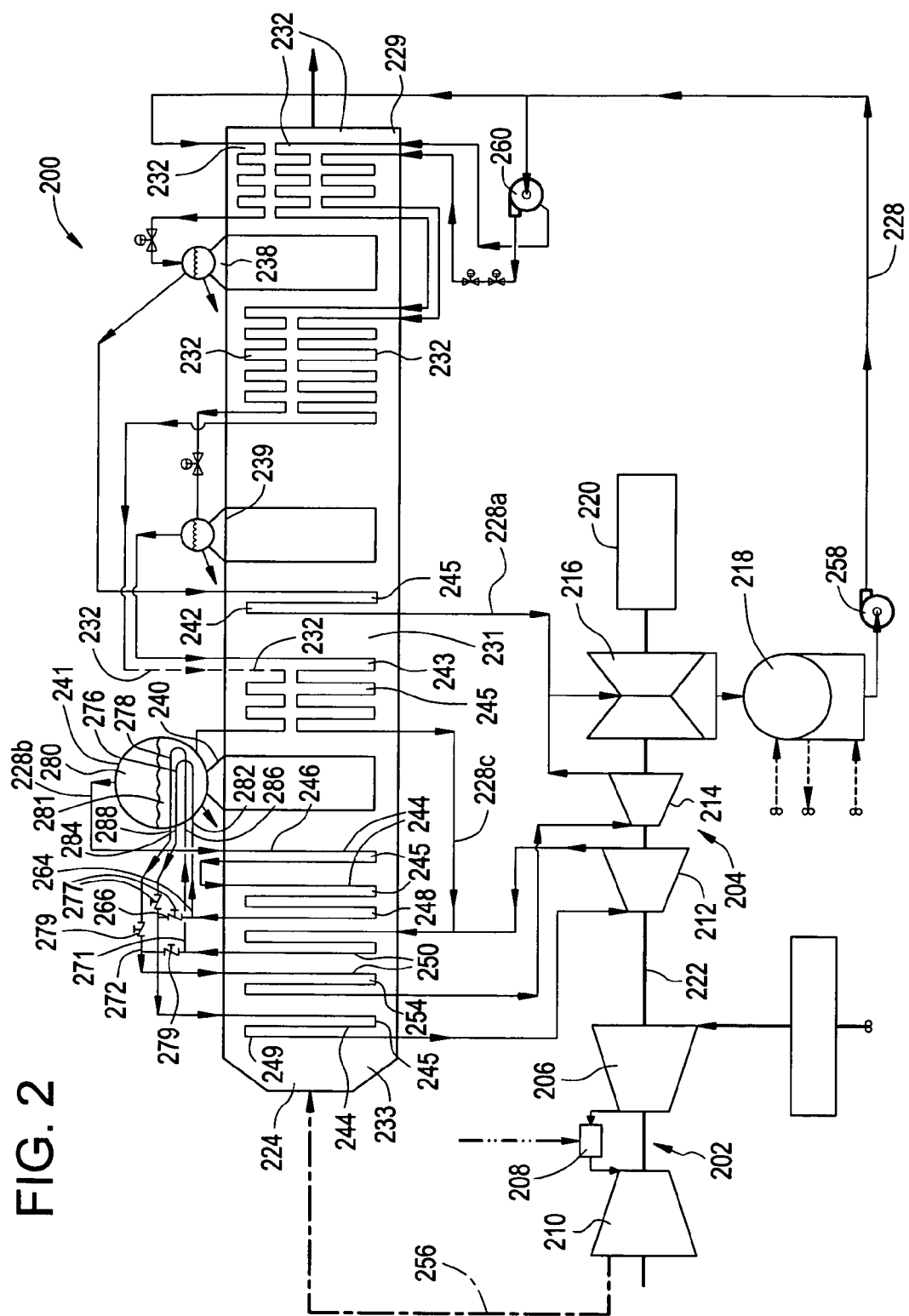
FIG. 2 is a schematic flow diagram of a system for controlling steam temperature without water attemperation or the performance penalty therefrom, wherein the system is in accordance with a second embodiment.

Referring to FIG. 2, a second embodiment of a system 200 for controlling steam temperature is illustrated and includes a gas turbine 202 and a steam turbine 204. The gas turbine 202 includes a compressor 206, a combustion area 208, and a turbine 210. The steam turbine 204 may include at least one high pressure section 212, at least one intermediate pressure section 214, and at least one low pressure section 216, wherein the at least one low pressure section 216 may exhaust into a condenser 218. The steam turbine 204 also drives a generator 220 that produces electrical power (or other load). The gas turbine 202 and steam turbine 204 are associated in tandem via a single shaft 222 that drives a single generator 220, though each may alternately drive separate loads.

The gas turbine 202 and steam turbine 204 are additionally associated with a multi-pressure heat recovery steam generator (HRSG) 224, which includes a high pressure (HP) region 233, an intermediate pressure (IP) region 231, and a low pressure (LP) region 229. The HRSG 224 also includes a steam circuit, which transports steam and water. The steam circuit is too expansive and complex to designate as a singular structure within the illustration, and thus will be named and numbered in sections hereinbelow. The HRSG 224 is associated with the gas turbine 202 via an exhaust gas conduit 256, which transports heated gas into the HRSG 224, and is associated with the steam turbine 204 via the steam circuit.

The steam circuit includes at least one superheater 245. The at least one superheater 245 to be discussed in detail is a high pressure (in relation to its positioning within the HRSG 224 and designated henceforth as HP) superheater circuit 244, illustrated to include a first HP superheater section 246, a second HP superheater section 248, and a third HP superheater section 249 although steam temperature control could be achieved with a single (one pass circuit) superheater section. The first HP superheater section 246, the second HP superheater section 248, and the third HP superheater section 249 are associated with each other within the HP superheater 244 in a manner that allows steam to flow downstream from the first HP superheater section 246, through the second HP superheater section 248, and into the third HP superheater section 249. The LP region 229 and IP region 231 of the HRSG 224 may optionally include an LP superheater 242 and an IP superheater 243.

The steam circuit also includes a reheater circuit 250, illustrated to include a first reheater section 252 and a second reheater section 254, although steam temperature control could be achieved with a single (one pass circuit) reheater section. The first reheater section 252 and the second reheater section 254 are associated with each other within the reheater circuit 250 in a manner which allows steam to flow downstream from the first reheater section 252 to the second reheater section 254.

The steam circuit further includes at least one dilution region and at least one supply region, wherein the at least one dilution region is illustrated as a superheater dilution region 266 and a reheater dilution region 272, and at least one supply region is illustrated as a superheater supply region 264 and a reheater supply region 271. The at least one dilution region and the at least one supply region are associated via at least one cooling coil, wherein the at least one cooling coil is illustrated as a superheater cooling coil 276 and a reheater cooling coil 278. The at least one cooling coil is at least partially disposed within at least one cooling area, such as at least one cooling cavity defined by at least one cooling drum, which will be described in greater detail below.

With reference again to the steam circuit, there is also included at least one economizer (illustrated throughout at 232) and at least one evaporator. The at least one evaporator may include an LP evaporator 238, an IP evaporator 239, and an HP evaporator 240, wherein at least one of the LP evaporator 238, IP evaporator 239, and HP evaporator 240 may include the at least one cooling drum, briefly mentioned above, and illustrated in FIG. 2 as an HP cooling drum 241 included in the HP evaporator 240.

The HP cooling drum 241 defines the cooling cavity 280, also mentioned above, which contains a fluid 281. The HP cooling drum 241 also defines a superheater coil inlet opening 282, a superheater coil exit opening 284, a reheater coil inlet opening 286, and a reheater coil exit opening 288. The superheater coil inlet opening 282 and superheater coil exit opening 284 are disposed to allow the superheater cooling coil 276 to enter and exit the cooling cavity 280. Similarly, the reheater coil inlet opening 286 and reheater coil exit opening 288 are disposed to allow the reheater cooling coil 278 to also enter and exit the cooling cavity 280. The portions (at least a portion of each) of both the superheater cooling coil 276 and reheater cooling coil 278, which are contained within the cooling cavity 280, are submerged within the containing fluid 281 (water) to effect a cooling process of the steam within the coils.

Again referring back to the steam circuit, it should be appreciated that there is included at least one steam flow controlling device disposed along the steam circuit, wherein the at least one steam flow controlling device may be a device such as at least one valve, illustrated as at least one superheater coil valve 277 and at least one reheater coil valve 279.

With the components of the system 200 introduced (excepting some illustrated steam circuit sections and pumps), the manner in which these components interact will now be discussed. Condensate is fed from the condenser 218 to the LP region 229 of the HRSG 224 via at least one condensate line 228 (section of the steam circuit) with the aid of a condensate pump 258. The condensate subsequently traverses at least one economizer 232 and the LP evaporator 238, before being superheated and returned to the at least one low pressure section 216 of the steam turbine 204 via at least one low pressure conduit 228a (section of the steam circuit).

With the aid of a pump 260, feedwater passes into the LP region 229 of the HRSG 224, wherein the feedwater travels to at least one economizer 232 and into the IP evaporator 239 and HP evaporator 240. The HP evaporator 240 thus recovers exhaust energy necessary to supply a latent heat that converts feedwater to HP steam. Steam exiting the HP evaporator 240 is transported on to the HP superheater circuit 244 via a steam conduit 228b (section of the steam circuit). Similarly, the IP evaporator 239 recovers exhaust energy necessary to supply a latent heat that converts feedwater to IP steam, wherein the steam is transported from the IP evaporator 239 to the reheater circuit 250 via at least one a steam conduit 228c (section of the steam circuit).

Steam traveling from the HP evaporator 240 enters the HP superheater circuit 244, and travels through the first HP superheater section 246 and second HP superheater section 248. From the second HP superheater section 248, at least a portion of the steam passes into at least one of the third HP superheater section 249 and the superheater cooling coil 276 with the aid of the at least one superheater coil valve 277. If any portion of the steam passes to the superheater cooling coil 276, it does so by exiting the second HP superheater section 248 from the superheater supply region 264.

Steam which does pass into the at least one superheater cooling coil 276 traverses the at least one superheater cooling coil 276, including the portion contained within the cooling cavity 280 of the HP cooling drum 241, wherein the fluid 281 within the cooling cavity 280 cools the steam within the at least one superheater cooling coil 276. The at least one superheater coil valve 277 may then allow the cooled steam from the at least one superheater cooling coil 276 to pass into the at least one superheater dilution region 266, wherein the cooled steam from the superheater cooling coil 276 may dilute and cool/control the temperature of the steam passing from the second HP superheater section 248 into the third HP superheater section 249 without use of water spray attemperation. Eliminating water spray attemperation further eliminates the performance penalty associated with supplying the latent heat of vaporization for a water spray entirely with exhaust energy hotter than the water saturation temperature, improving combined cycle efficiency. Whether diluted or not, the steam which passes into the third HP superheater section 249 traverses the third HP superheater section 249, and exits the third HP superheater section 249 and HP superheater circuit 244 in general.

Referring now to the reheater circuit 250, steam from at least one of the steam turbine 204 and the IP superheater 243 enters the reheater circuit 250, and travel through the first reheater section 252. From the first reheater section 252, at least a portion of the steam passes onto at least one of the second reheater section 254 and the reheater cooling coil 278 with the aid of the at least one reheater coil valve 279. If any portion of the steam passes to the at least one reheater cooling coil 278, it does so by exiting the first reheater section 252 from the reheater supply region 271.

Steam which passes into the reheater cooling coil 278 traverses the reheater cooling coil 278, including the portion contained within the cooling cavity 280 of the HP cooling drum 241, wherein the fluid 281 within the cooling cavity 280 cools the steam within the reheater cooling coil 278. The at least one reheater coil valve 279 may then allow the cooled steam from the reheater cooling coil 278 to pass into the at least one reheater dilution region 272, wherein the cooled steam from the reheater cooling coil 278 dilutes and thus cools/controls the steam which has traversed and been heated in the first reheater section 252, preventing steam in the reheater circuit 250 from exceeding the rated temperature of the HRSG 224, the IP steam turbine 204, and/or steam circuit without use of water spray attemperation. Eliminating water spray attemperation further eliminates the performance penalty associated with supplying the latent heat of vaporization for a water spray entirely with exhaust energy hotter than the water saturation temperature, improving combined cycle efficiency.

Whether diluted or not, the steam which passes into the second superheater section 248 traverses the second reheater section 254, and exits the second reheater section 254 and reheater 250 in general.

It should be appreciated, as was briefly mentioned above, that only one superheater and reheater pass is necessary to achieve a desired dilution of steam in superheater and reheater circuits. This could be achieved by disposing respective dilution regions downstream of (or in close proximity to) superheater circuit and reheater circuit exits. Multiple sections are typically employed however, (as is illustrated) so as to improve operability and cost. In addition, though the superheater and reheater supply regions 264 and 271 are illustrated upstream of the respective superheater and reheater dilution regions 266 and 272, this positioning is not necessary to the system 200. For example, a supply region could contain superheated or reheated steam hotter than steam contained within a counterpart dilution region, because that hotter steam will be cooled in the cooling coil before reaching the counterpart dilution region.

Referring to FIG. 3, a method 300 for controlling steam temperature is illustrated and includes attemperating reheat steam within at least one reheater dilution region 155 of a steam circuit with steam from at least one reheater supply region 141 of the steam circuit, as shown in Operational Block 302, wherein the at least one reheater supply region 141 is disposed upstream (in relation to steam flow) of the dilution region 155. Attemperation occurs via a reheater dilution conduit 178, which, along with a reheater circuit 150, associates the at least one reheater supply region 141 with the at least one reheater dilution region 155.

Referring to FIG. 4, a method 400 for controlling steam temperature is illustrated and includes attemperating steam within at least one dilution region of a steam circuit 228 with steam from at least one coolant coil, as shown in Operational Block 402, wherein the at least one cooling coil is disposed at least partially within at least one cooling area. The method 400 further includes associating the at least one dilution region with at least one supply region via the at least one cooling coil. This method can be applied to a reheater circuit 250 and/or a superheater circuit such as an HP superheater circuit 244.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A system for controlling steam temperature the system comprising:
   a steam circuit including a reheater circuit;
   at least one reheater dilution region;
   at least one reheater dilution conduit; and
   at least one reheater supply region disposed upstream in said steam circuit of said at least one reheater dilution region, wherein said at least one reheater supply region and said at least one reheater dilution region are in direct fluid communication via each of said reheater circuit and said at least one reheater dilution conduit.

2. A system for controlling a steam temperature according to claim 1, further including at least one steam flow controlling device associated with at least one of said reheater circuit and said at least one reheater conduit.

3. A system for controlling a steam temperature according to claim 2, wherein at least one steam flow controlling device includes at least one valve.

4. A system for controlling steam temperature, the system comprising:
   a steam circuit including at least one dilution region and at least one supply region;
   at least one cooling area; and
   at least one cooling conduit, wherein said at least one dilution region and said at least one supply region are in direct fluid communication via each of said steam circuit and said at least one cooling conduit, and wherein said at least one cooling conduit is at least partially disposed within said at least one cooling area.

5. A system for controlling a steam temperature according to claim 4, wherein said at least one cooling area is at least one cooling drum defining a cooling cavity.

6. A system for controlling a steam temperature according to claim 4, further including at least one steam flow controlling device disposed along said steam circuit.

7. A system for controlling a steam temperature according to claim 6, wherein at least one steam flow controlling device includes at least one valve.

8. A system for controlling a steam temperature according to claim 4, wherein said steam circuit includes a high pressure superheater circuit, a superheater dilution region, and a superheater cooling conduit.

9. A system for controlling a steam temperature according to claim 4, wherein said steam circuit includes a reheater circuit, a reheater dilution region, and a reheater cooling conduit.

10. A system for controlling a steam temperature according to claim 5, wherein said cooling cavity contains a fluid, and said at least one cooling conduit is at least partially submerged within said fluid.

11. A method for controlling steam temperature, the method comprising:
    disposing at least one reheater dilution region in direct fluid communication with at least one reheater supply region via each of a reheater circuit included in a steam circuit and at least one reheater dilution conduit; and
    attemperating reheat steam within said at least one reheater dilution region of said steam circuit with steam from said at least one reheater supply region of said steam circuit, wherein said at least one reheater supply region is disposed upstream of said reheater dilution region.

12. A method for controlling steam temperature, the method comprising:
    disposing at least one dilution region in direct fluid communication with at least one supply region via each of a steam circuit and at least one cooling conduit; and
    attemperating steam within said at least one dilution region of said steam circuit with steam from said at least one cooling conduit, wherein said at least one cooling conduit is disposed at least partially within at least one cooling area.

* * * * *